Nov. 2, 1937.   W. F. NEWHOUSE   2,097,499
STAPLING MACHINE
Original Filed Aug. 22, 1932   9 Sheets-Sheet 1
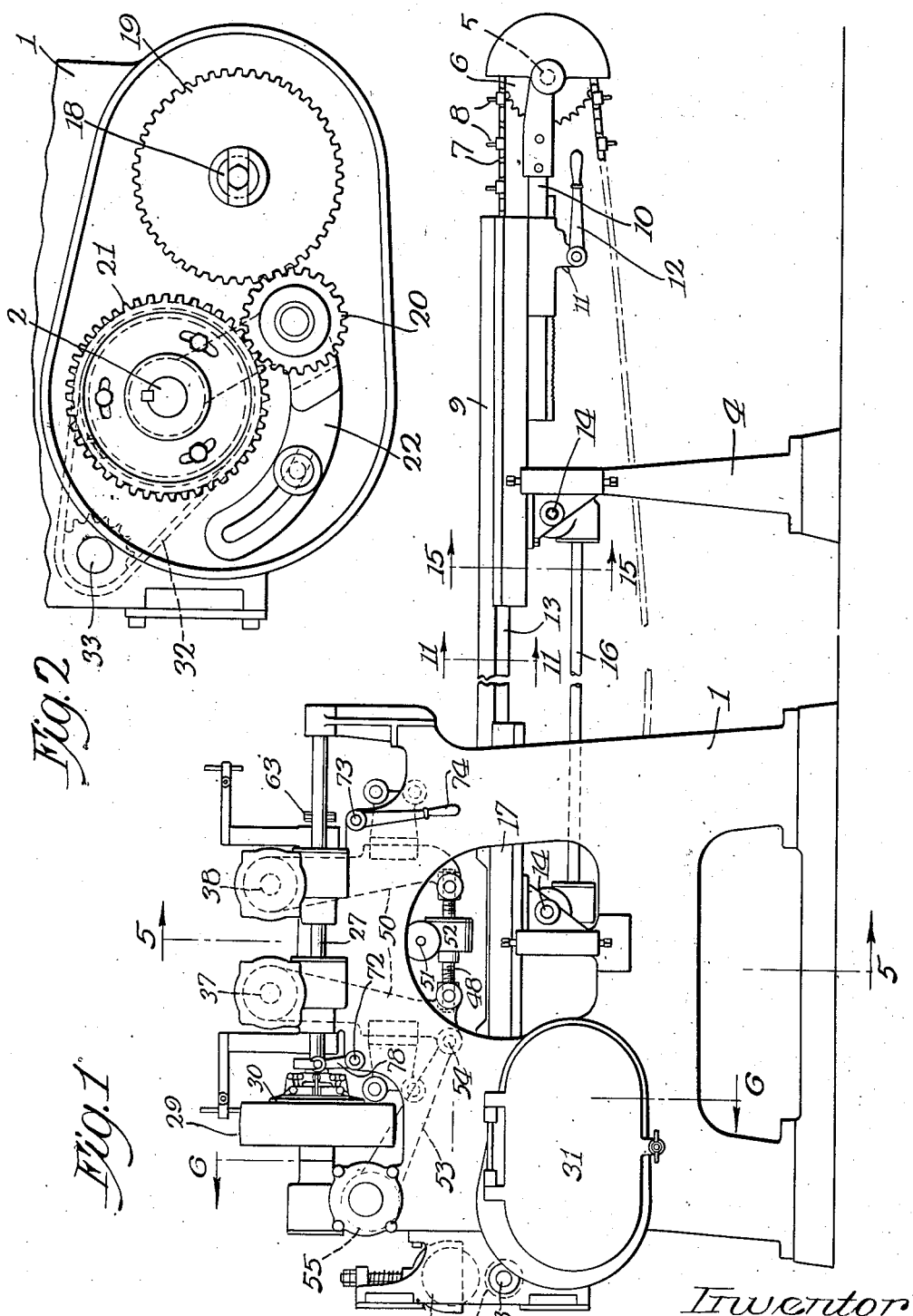

Nov. 2, 1937.    W. F. NEWHOUSE    2,097,499
STAPLING MACHINE
Original Filed Aug. 22, 1932    9 Sheets-Sheet 2

Inventor:
Walter F. Newhouse
By Arthur F. Durand Atty.

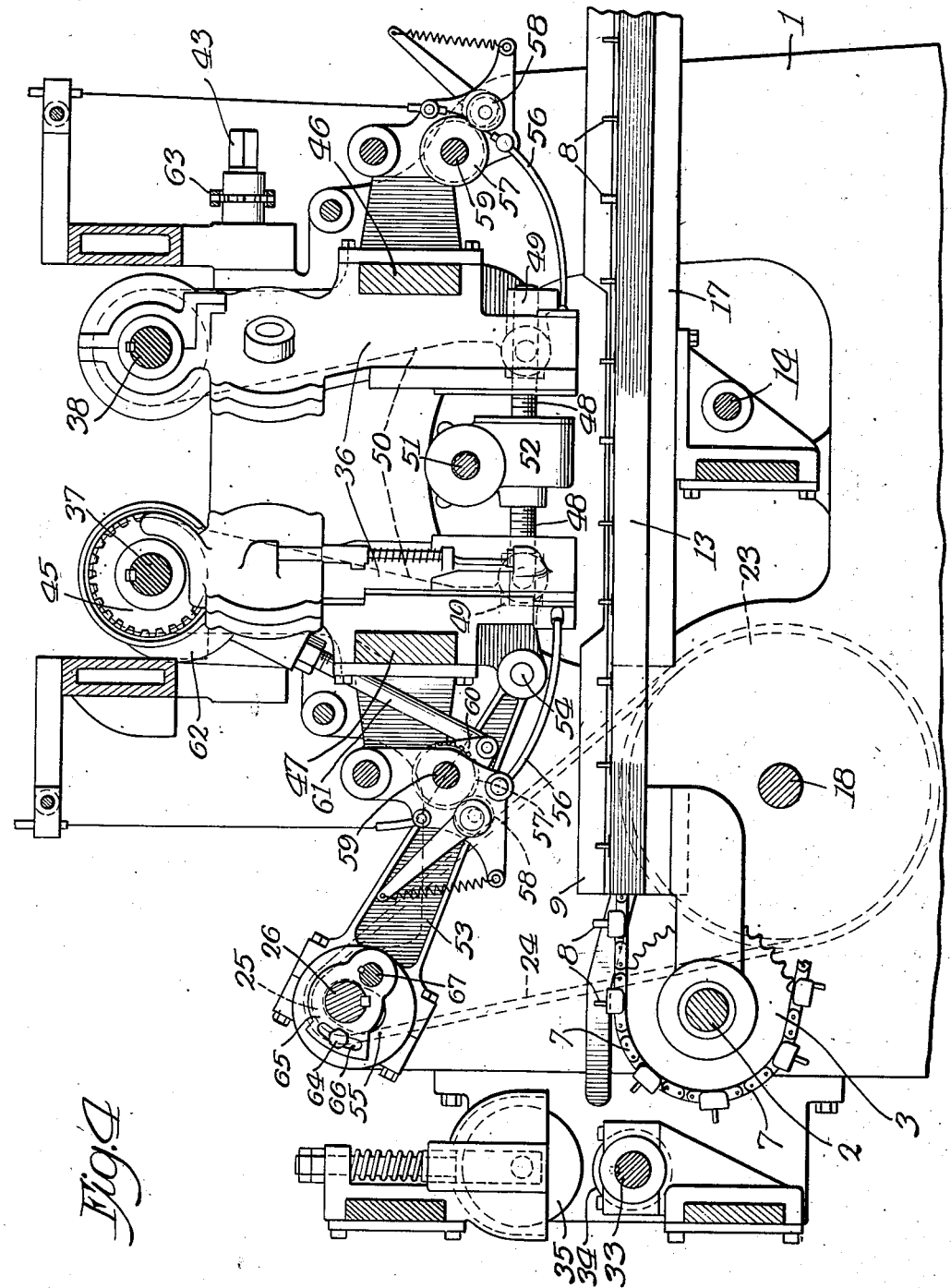

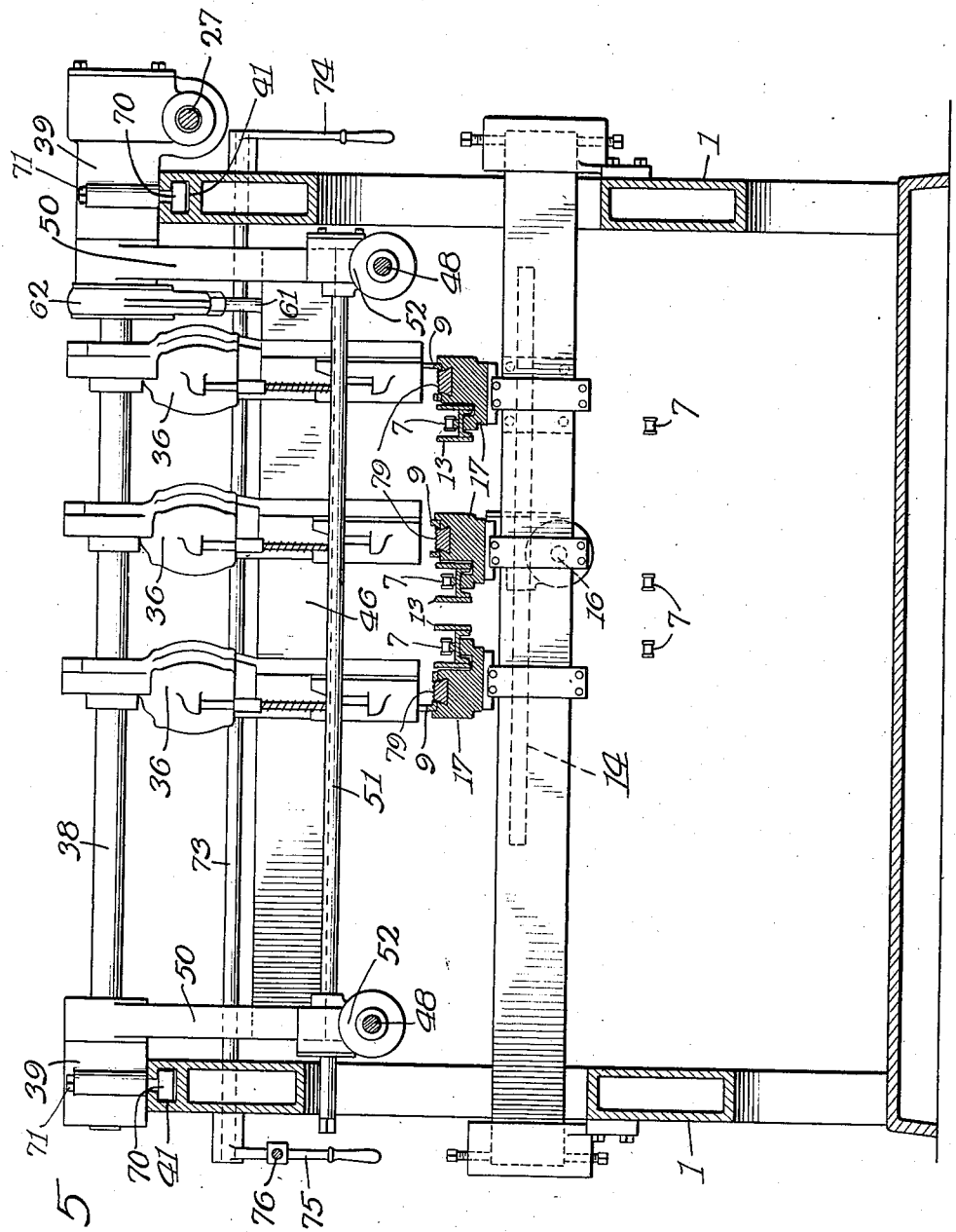

Nov. 2, 1937.                W. F. NEWHOUSE                2,097,499
                              STAPLING MACHINE
           Original Filed Aug. 22, 1932        9 Sheets-Sheet 5
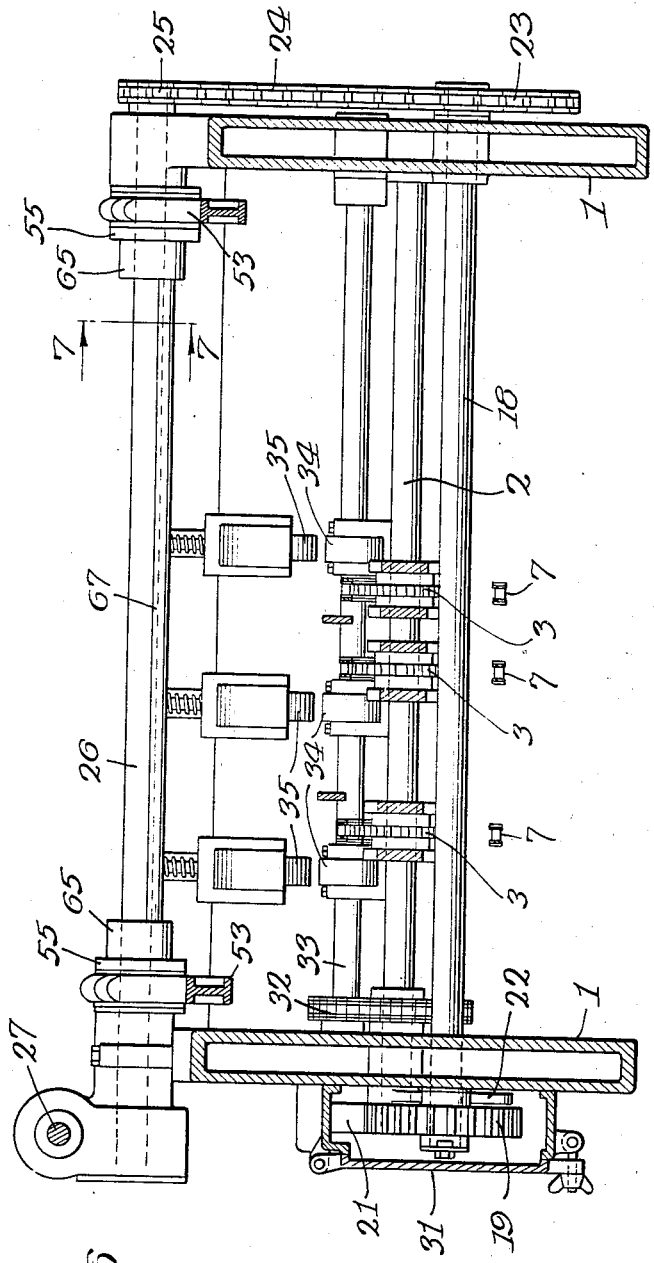
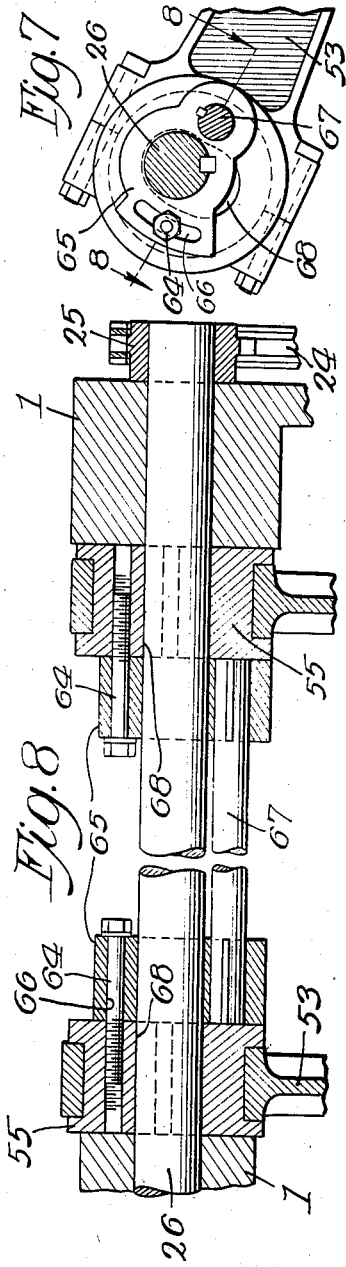
Inventor:
Walter F. Newhouse
By Arthur F. Durand Atty.

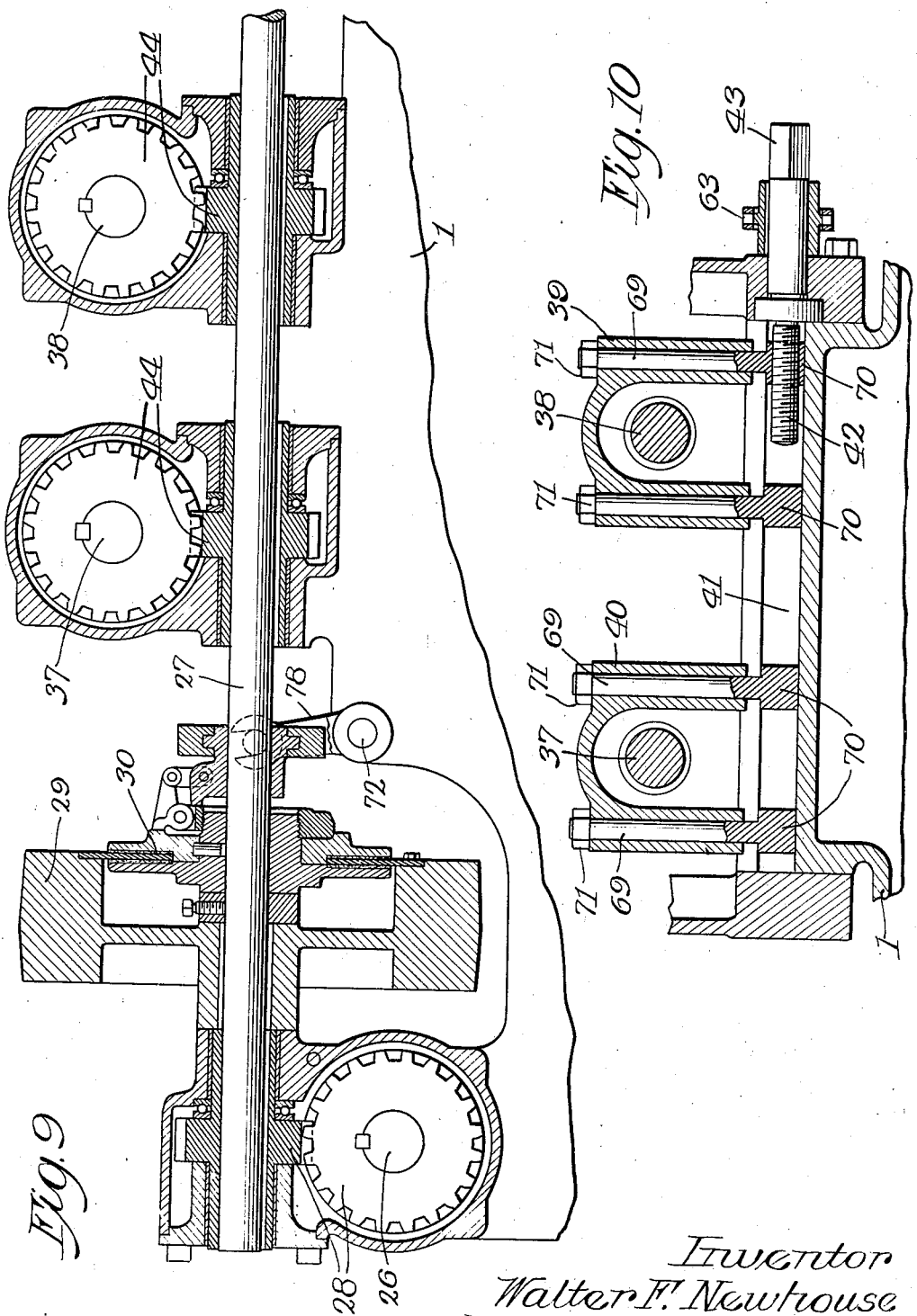

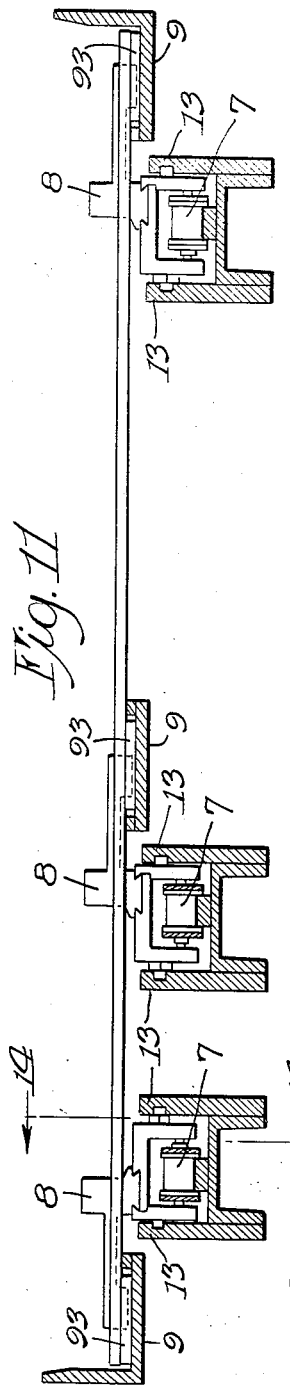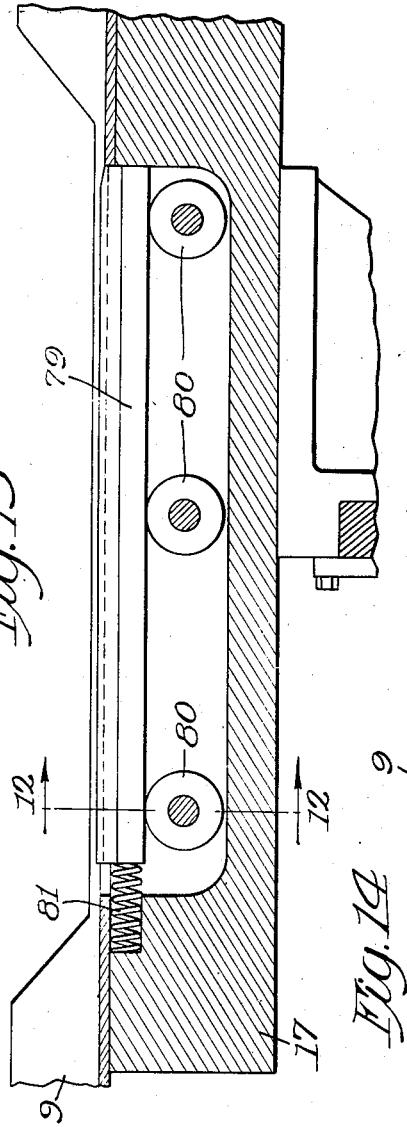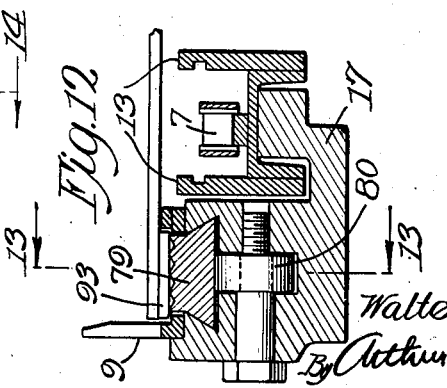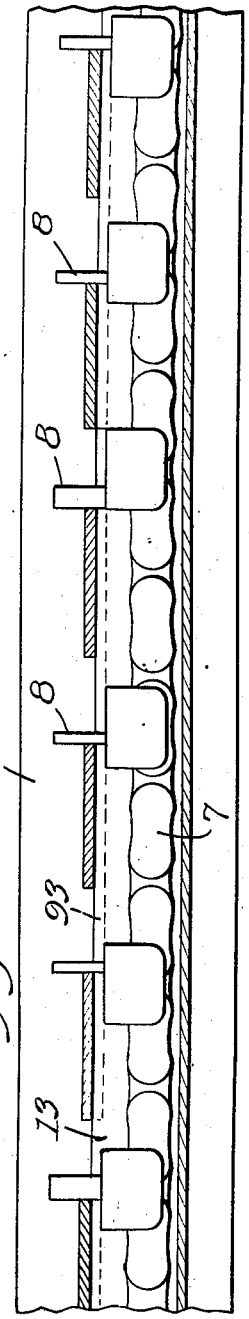

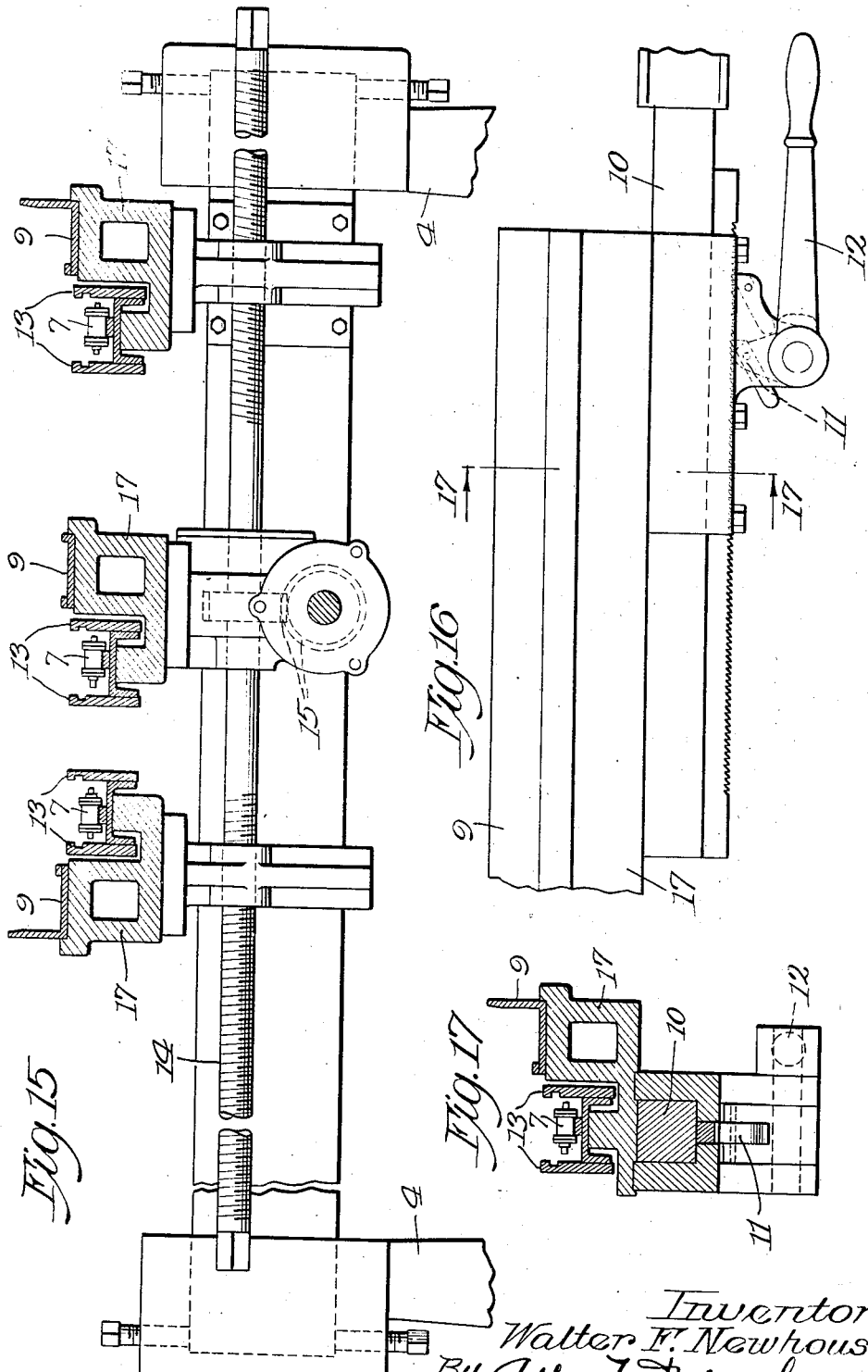

Nov. 2, 1937. W. F. NEWHOUSE 2,097,499
STAPLING MACHINE
Original Filed Aug. 22, 1932  9 Sheets-Sheet 9
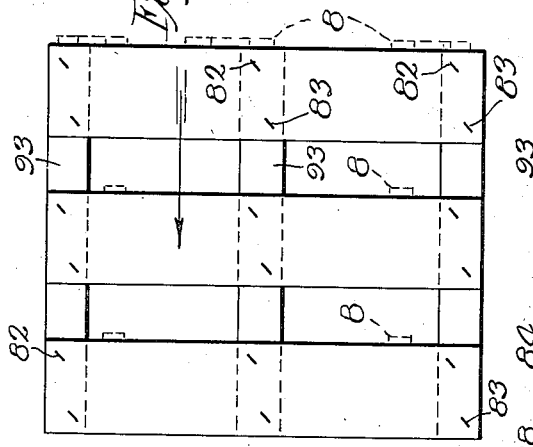
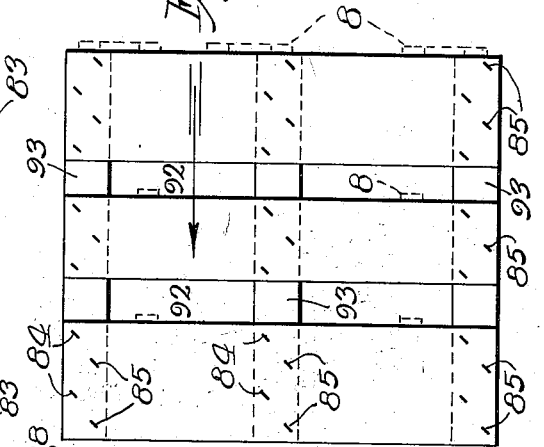
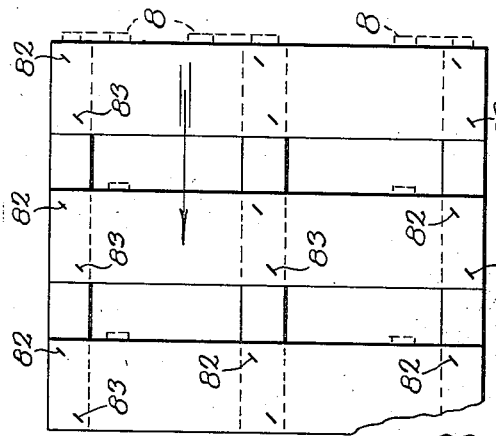
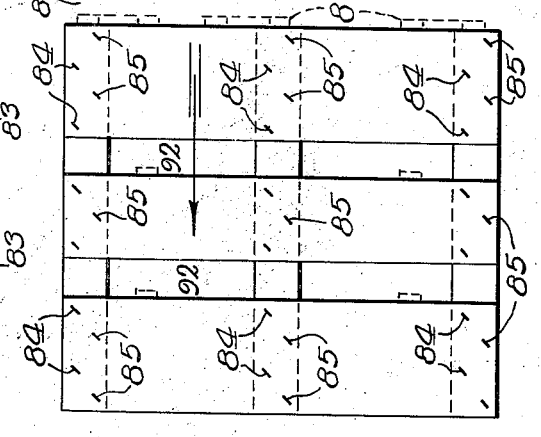
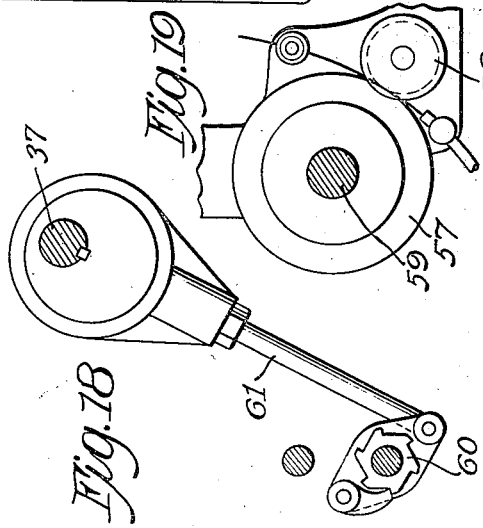
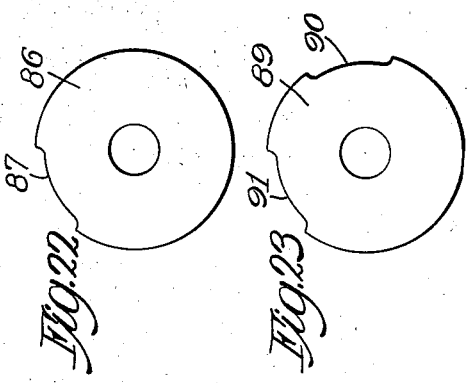
Inventor:
Walter F. Newhouse
By Arthur H. Durand
Atty.

Patented Nov. 2, 1937

2,097,499

UNITED STATES PATENT OFFICE 2,097,499

STAPLING MACHINE

Walter F. Newhouse, Benton Harbor, Mich.

Application August 22, 1932, Serial No. 629,795
Renewed February 11, 1937

47 Claims. (Cl. 1—8.1)

This invention relates to machinery for making so-called crate sides, or similar products, comprising sheet material stapled together to form the sides of crates, or of similar containers.

Generally stated, the object of the invention is to provide a novel and improved construction and arrangement whereby a machine of this kind is easily adjustable for the feeding of materials of different sizes, and for the proper positioning of the staples in the materials, whereby the product of the machine may vary considerably, in form or size, the machine being preferably provided, in order to carry out these objects, with staplers which are adjustable both laterally and longitudinally of the machine, whereby the relative positioning of the staples may be accomplished in an easy and effective manner.

It is also an object to provide certain details and features of construction and combinations tending to increase the general efficiency and the desirability of a crate side stapling machine of this particular character.

To the foregoing and other useful ends, the invention consists in matters hereinafter set forth and claimed and shown in the accompanying drawings, in which—

Fig. 1 is a side elevation of a crate side stapling machine involving the principles of the invention.

Fig. 2 is an enlarged side elevation of the adjustable gearing for driving the work-feeding or controlling means, whereby to vary the speed of the feeding motion of the materials, relatively to the speed of the staplers, when it is necessary to position the staples in a different manner on the work.

Fig. 4 is a longitudinal section of said machine on line 4—4 in Fig. 3 of the drawings.

Fig. 5 is a transverse section of said machine on line 5—5 in Fig. 1 of the drawings.

Fig. 6 is a vertical transverse section on line 6—6 in Fig. 1 of the drawings.

Fig. 7 is a detail section on a larger scale, on line 7—7 in Fig. 6 of the drawings.

Fig. 8 is a detail section, on line 8—8 in Fig. 7 of the drawings.

Fig. 9 is an enlarged longitudinal vertical section, of certain portions of the machine, on line 9—9 in Fig. 3 of the drawings.

Fig. 10 is a similar view on line 10—10 in Fig. 3 of the drawings.

Fig. 11 is an enlarged transverse section on line 11—11 in Fig. 1 of the drawings.

Fig. 12 is a vertical detail section showing clinching anvil structure on line 12—12 in Fig. 13 of the drawings.

Fig. 13 is a detail vertical section on line 13—13 in Fig. 12 of the drawings.

Fig. 14 is a detail vertical section on line 14—14 in Fig. 11 of the drawings.

Fig. 15 is a transverse vertical section, on a larger scale, on line 15—15 in Fig. 1 of the drawings.

Fig. 16 is a detail view, on a larger scale, showing a device for tightening the feed belts.

Fig. 17 is a vertical section on line 17—17 in Fig. 16 of the drawings.

Fig. 18 is a detail view showing the eccentric device for operating the wire feed mechanism.

Fig. 19 is a detail view showing the feed wheels of one of the devices for feeding the wire from which the staples are made.

Fig. 20 is a plan view of two successive crate sides made on said machine.

Fig. 21 is a similar view showing two crate sides of different form.

Figs. 22 and 23 are side elevations of interchangeable rolls that can be used on the wire feed mechanism, thereby to automatically and periodically render one or more of the staplers inoperative to drive staples, when it is desired to skip places on the work and drive no staples therein.

Figure 3:
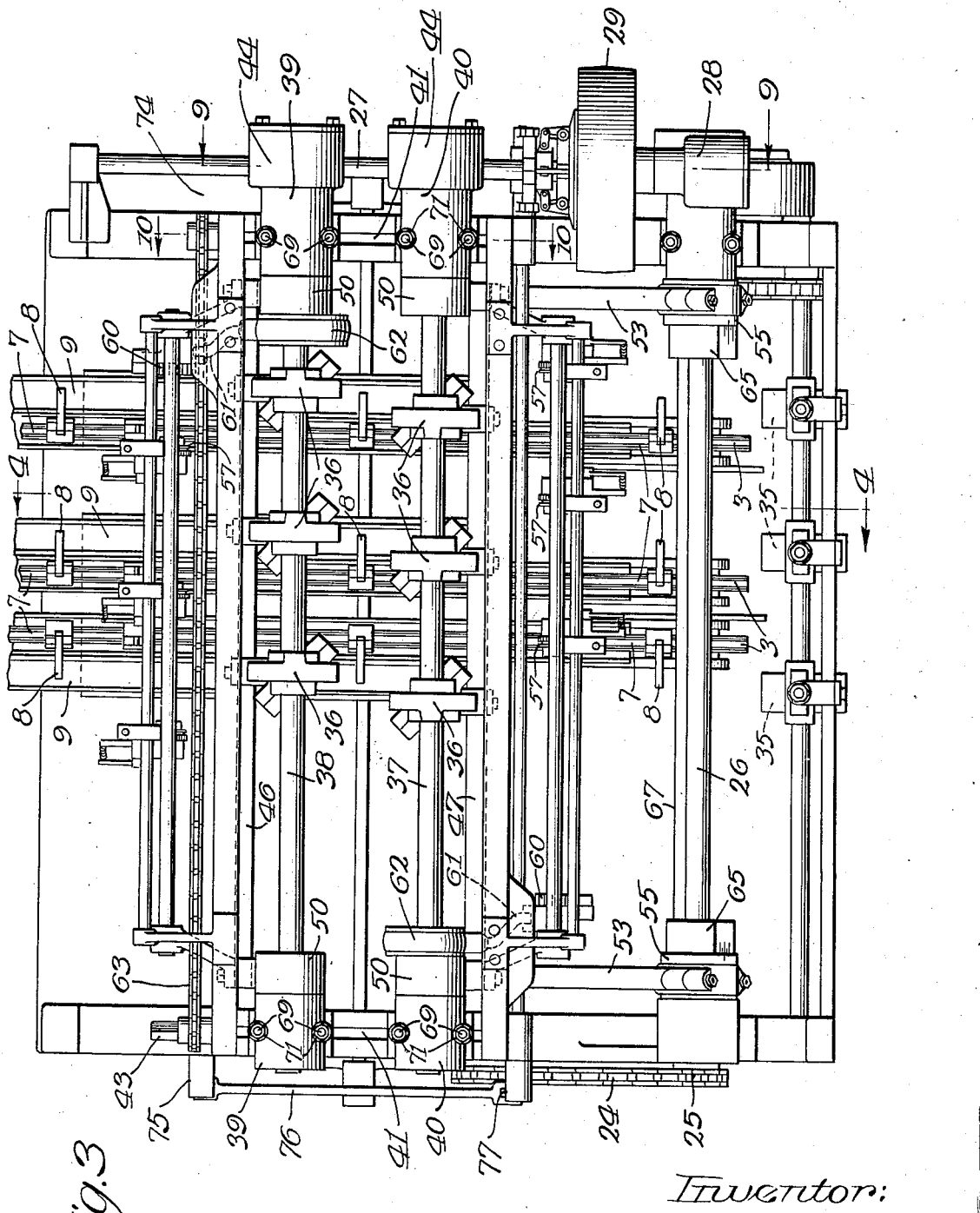
Fig. 3 is a plan view of the machine shown in Fig. 1, with one end portion thereof shown broken away for convenience of illustration.

As thus illustrated, the invention comprises a machine body 1, of any suitable character, adapted to support the transverse shaft 2, upon which the sprockets 3 are mounted. A supplemental frame or body 4 is provided, for supporting the transverse shaft 5 upon which the sprockets 6 are mounted. Feed chains 7, provided with feed dogs 8, are supported on said sprockets, to feed the materials along the channel guides 9, which latter extend longitudinally of the machine. It will be seen that the shaft 5 is supported on a supplemental and endwise movable frame section 10, which latter is adjustable by means of the ratchet device 11, which latter is operable by the handle 12, whereby the shaft 5 and its sprockets 6 can be moved a distance to properly support the feed chains 7, which latter travel in the trough-shaped guides 13 (see Fig. 15). Transverse screws 14, with right and left threads, support the guides 9 and 13, as shown in Fig. 15, and through the medium of worm gearing 15, and the longitudinal shaft 16, connecting the two screws 14 together, a rotation of either screw, by a key or tool applied to the squared outer end thereof, will rotate the two screws 14 in unison. In this way, the middle guides 17, and the left hand guide 17, looking at Fig. 5 of the drawings, will be moved laterally, so that in effect all three guides will be moved relatively toward or away from each other, in accordance with the requirements of the particular work being done on the machine.

To drive the feed belts or chains 7, the transverse shaft 18 is provided with a gear 19, which engages the idler 20, the latter in turn engaging the gear 21 on the shaft 2, previously mentioned. The idler 20 is on the adjustable bracket 22, and with this arrangement a larger or smaller gear 19 can be substituted for the one shown, by adjustment of said bracket, thereby to change the speed of travel of the feed chains. The shaft 18 is rotated by a sprocket 23 secured thereon, which sprocket is in turn connected by a sprocket chain 24 with a smaller sprocket 25 on the transverse shaft 26, which latter is in turn driven from the longitudinal shaft 27 through the medium of the helical gears 28, the said shaft 27 having a loose driving pulley 29 thereon, and having a suitable friction clutch 30 for connecting the pulley with the shaft 27, when it is desired to operate the machine. It will be seen that the gears 19, 20, and 21, and the adjustable bracket 22, are preferably enclosed in a gear case or housing 31, of any suitable or desired character.

A sprocket chain 32 connects the shaft 2 with the shaft 33, whereby the latter is driven to rotate the rollers 34 that cooperate with the spring-pressed upper rollers 35 to flatten the staples flush with the surface of the veneer or sheet materials from which the crate sides are made.

The staplers 36—in this particular case, six in number—are hung on the transverse shafts 37 and 38, which latter are supported at opposite sides of the machine by bearings 39 and 40, which bearings are set in the longitudinal guides 41, formed on the tops of the side frames of the body of the machine. The bearings 40 are preferably fixed in their supports, but the bearings 39 are adjustable longitudinally of the machine, by means of the screw devices 42 (see Fig. 10) provided for this purpose, the outer end of this screw being provided with a squared portion 43 for engagement with a key or tool by which the screws can be rotated. In this way, the shaft 38 is adjustable toward and away from the shaft 37, in order to change the relation of the staplers to each other, so that the staples may be driven either closer together or farther apart, as will hereinafter more fully appear. The shafts 37 and 38 are rotated in the desired manner, at the requisite speed, by helical gear connections 44 between these shafts and the longitudinal shaft 27, previously mentioned, as illustrated in Fig. 9 of the drawings. In addition, each stapler has a helical gear driving connection 45, with its supporting shaft. The staplers are set at angles, when viewed from above, as shown in Fig. 3 of the drawings, to drive the staples obliquely into the sheet materials, as shown in Figs. 20 and 21 of the drawings. As the staplers must always be in line with, or in proper relation to, the guides 9, the said staplers are adjustable laterally on their supporting shafts 37 and 38, in any suitable or desired manner. Thus, there are two gangs of staplers, one for the shaft 37, and one for the shaft 38, and the staplers of one gang are connected together to swing in unison by the bar 46, and the staplers of the other gang are similarly connected to swing in unison by the bar 47, whereby these staplers are free to swing longitudinally of the machine, in suitably timed relation to the feed belts 7, it being observed that the latter have a continuous feeding motion, whereby it is desirable to have the staplers move a distance with these feed belts, while staplers are actually being inserted in the materials. By adjusting the staplers laterally, on the shafts 37 and 38, the distance between the parallel longitudinal rows of staples may be changed or varied to suit the requirements.

Preferably, the two stapler gangs are connected together by the screws 48, having right and left threads, the ends of these screws being threaded into suitable oscillatory blocks or nut members 49 on the lower ends of the hangers 50, which latter are rigid with the bars 46 and 47, and are hung on the shafts 37 and 38, or on bars formed on the inner sides of the bearings 39 and 40, as shown more clearly in Figs. 4 and 5 of the drawings. The screws 48 are connected together by a transverse shaft 51, having helical gear connections 52, or gear connections of any suitable character, with the shafts 48, whereby rotation of the transverse shaft 51, by means of a key or tool applied to the squared end thereof, at one side of the machine, will rotate the two screws 48 in unison, and thereby move the lower ends of the two stapler gangs toward or away from each other, in accordance with the adjustments of the shafts 37 and 38 toward or away from each other. In other words, each of the transverse bars 46 and 47 carries a plurality of staplers, and each plurality constitutes a swinging gang of staplers, the two gangs being adapted to swing in unison, back and forth, while operating simultaneously in unison for driving staples in the continuously moving work, and being adapted for adjustment toward or away from each other to vary or change the relative positions of the staples on the work.

For the purpose of oscillating or swinging the stapler gangs back and forth, pitmans 53 are pivoted on the adjacent gang at 54, and having their other ends mounted on eccentric devices 55 carried on the shaft 26, previously mentioned. Thus, the staplers themselves are actuated from the driving shaft 27, while the swinging motion of the staplers is also caused by the connections 53 with said driving shaft, and in addition the feed belts 7, previously mentioned, are also driven from this main longitudinal driving shaft 27, in the manner previously described.

The wire for the staples can be fed to the staplers in any suitable or desired manner. As shown in the drawings, the staplers are provided with guide tubes 56 for directing the wire to the lower ends of the staplers, and feed rolls 57 and 58 are provided to fed the staple wire into these tubes. The positively actuated rolls 57 are mounted on shafts 59 carried by the stapler gang frames, and these shafts 59 are actuated by ratchet feed devices 60, which latter are in turn actuated by pitmans 61, having their upper ends operated by eccentric devices 62 on the overhead shafts 37 and 38, whereby these two shafts provide power-transmitting connections whereby the main drive shaft 27 is again operative to furnish power to operate the feed devices by which the staple wire is fed to each stapler. These feed roll devices are common and well known, and are adjustable laterally on their transverse shafts, in a well known manner, but, preferably, these feed devices are actuated from the overhead shafts 37 and 38 in the manner shown and described.

As a matter of further and special improvement, the screws 42 are preferably connected together by a sprocket chain 63, whereby the rotation of one screw, by a suitable tool, will cause simultaneous adjustment of both screws.

Still another matter of special improvement is the method of adjusting the swinging stroke of the stapler gangs. This is done, in effect, by changing the degree of eccentricity of the eccentric devices 55 on the shaft 26. For this purpose, these eccentric cam devices 55 have their cams fastened by bolts 64 to the bracket plates 65 on the shaft 26, these bracket plates having slots 66 for said bolts. The two bracket plates 65 are keyed together by being splined on the rod or shaft 67 (see Figs. 7 and 8 of the drawings), whereby when the bolts 64 are loosened, the cams of the devices 55, which have slots 68 therein, are movable on the shaft 26 in a manner to vary the degree of eccentricity of these eccentric devices that produce the swinging movement of the stapler gangs. But the actuation of the pitmans 53 can be accomplished by eccentric devices of any suitable or desired character, so far as the broader aspects of the invention are concerned.

It will also be seen that special means are preferably provided for holding the bearing blocks 39 and 40 in position in the guides 41, in the nature of vertically disposed bolts 69 (see Fig. 10 of the drawings), extending downwardly through said bearing blocks and having their heads 70 formed to slide in said guides. Therefore, when the nuts 71 are tightened, the bearing blocks 39 and 40 will be clamped tightly upon said guides.

As a convenience, it is desirable that the friction clutch mechanism 30 be controllable from either side of the machine, and for this purpose two transverse rock shafts 72 and 73 are provided, suitably mounted on the frame of the machine. The shaft 73 is provided with handles 74 and 75 at opposite ends thereof, and the handle 75 is connected by a rod 76 with an arm 77 on the end of the rock shaft 72, whereby the rocking of the shaft 73 by the handle 74, or the handle 75, will also rock the shaft 72, and will thereby operate the said friction clutch to close the clutch and start the machine. A reverse motion of either handle will then open the clutch and stop the machine. This manual control of the driving clutch, it will be seen, is exercised through the medium of the arm 78 on the shaft 72, which arm engages and controls the clutch mechanism, whereby the starting and stopping of the machine is controlled at will.

As a matter of further and special improvement, in order to properly clinch the staples driven by the staplers, on the under side of the materials of the work, sliding clinch bars 79 are provided in the guides 9, as shown more clearly in Figs. 12 and 13, resting on rollers 80, as shown. These bars are held in normal position by coil springs 81, as shown. The tops of these bars 79 are preferably grooved or roughened, as shown in Fig. 12, thereby to engage the sheets of veneer, or other material, of the work. The staples that are inserted through the work impinge on the tops of these bars 79 and are clinched by the latter in the desired manner. During such driving and clinching of the staples, the bars 79 move forward against the yielding pressure of the springs 81, whereby these bars travel with the work a distance sufficient to clinch the staples. Preferably, the bars 79 are dovetail in formation, as shown in Fig. 12 of the drawings, so that they are held against upward displacement from their guides in which they slide longitudinally. Of course, as soon as the staplers release their pressure on the work, having driven the staples, and start back in the other direction, these clinching bars are returned to their normal positions by the springs 81, whereby the staplers and the clinch bars practically move back and forth in unison.

In the operation of the machine, the staplers on the shaft 37 insert the staples 82, in Fig. 20 of the drawings, while the staplers on the shaft 38 insert the staples 83, shown in this figure of the drawings. In a similar manner, when the form of crate side shown in Fig. 21 is desired, the staplers on the shaft 37 insert the staples 84, while the staplers on the shaft 38 insert the staples 85, shown in this figure of the drawings. For the stapling shown in Fig. 20 of the drawings, continuous or entirely cylindrical feed rolls are employed, to feed the wire, as shown in Fig. 19 of the drawings. However, when the stapling shown in Fig. 21 is desired, then, to drive the staples 84, the feed rolls 57 are taken off and feed rolls such as the one 86, shown in Fig. 22, are substituted therefor. This feed roll 86 has a gap or mutilation 87 in the periphery thereof, so that the wire is not fed at certain times, thereby preventing the driving of staples 84 in the gaps 88 between the blanks. To drive the staples 85, the staplers that do this are provided with feed rolls of the kind shown in Fig. 23 of the drawings, this feed roll 89 having two gaps 90 and 91 in the periphery thereof, whereby no staples 85 are driven in the gaps 88, or in the gaps 92 of the blanks. In this way, skipping mechanism is provided for preventing the driving of staples in any of the gaps, either in the gaps in the blanks themselves, or in the gaps between the blanks, when strips of veneer or other sheet material of unequal width, or of different widths, are used in the manner shown in Fig. 21 of the drawings. In both cases, of course, the transverse strips of veneer shown are stapled to the battens 93 of the blanks, to the upper sides thereof, these longitudinal battens or strips sliding in the guides 9, previously mentioned. Obviously, therefore, blanks of different shapes or sizes, having strips of different widths or sizes, can be made on this machine, without driving staples in the gaps between strips, or in the gaps between blanks, by suitably adjusting the feed mechanism that feeds the steel wires to the staplers, from which the staples are made. If no wire is fed to a stapler, no staple is formed at such time, and no staple is wasted on a space in the work, and no staples are driven in the battens, except those that are inserted through both the transverse strips and the longitudinal battens, thereby to hold them together. In other words, no staples are driven through only a single thickness, and no staples are driven in spaces where there is nothing to receive them. And, of course, while looking at Figs. 20 and 21, it will be understood how the adjustment of the staplers, laterally of the machine, and of the two gangs of the staplers toward and away from each other, is advantageous in the proper placing or positioning of the staples on the work, for in some cases the staples must be closer together longitudinally of the machine, and in some cases wider apart; and in some cases, the staples must be closer together transversely of the machine, for narrower blanks for crate sides, and hence the machine is of such universal or elastic adjustment, so to speak, that the staples can be placed at the exact spots or places where they are necessary or desirable.

Obviously, by changing the gear 19, as previously explained, the speed of travel of the materials will be changed, and this will change the distance between successive pairs of staples, in each longitudinal row of staple pairs.

With the foregoing construction and mode of operation, it will be seen that one gang of staplers is disposed in front of another gang of staplers, whereby one gang inserts longitudinal rows of staples while the other gang inserts parallel rows of staples, whereby each stapler inserts a row of successively driven staples in each unit of work, these rows extending parallel with the direction in which the materials are caused to feed or move through the machine.

From the foregoing it will be seen that the two gangs of staplers operate in unison, successively, a plurality of times on each unit of work, and in this case, as shown, the unit of work is a complete crate side. Consequently, the two gangs of staplers operate in unison to drive staples in longitudinal rows, in each unit of work, and also in transverse rows, and the transverse rows of the staples driven by one gang are spaced from and parallel with the transverse rows driven by the other gang. Therefore, the two gangs insert successive groups of staples in each unit of work, and each group is in rear of the previous group, and thus the staples are in rows longitudinally from the front to the rear end of each unit of work. With the adjustments shown and described, the transverse rows of staples can be either closer together or farther apart, and the longitudinal rows of staples can be either closer together or farther apart. Also, it is obvious that the staplers of the second gang can be arranged in line with the first gang, so that the longitudinal rows of staples will each contain staples driven by both gangs. In this way there is considerable flexibility, and the staples can be driven in various ways to suit the requirements of different kinds of work.

Looking at Fig. 4 of the drawings, it will be seen that the two staplers 36 are disposed far enough apart so that one stapler is still operating a plurality of times on one blank while the other stapler is operating on the blank ahead, the staplers being relatively adjustable longitudinally of the machine, as previously explained, to relatively place the staples as may be desired for different kinds of work.

It will be seen, therefore, that means are provided to permit adjustment or changing of the ratio of conveyor speed to stroke rate of the staplers, whereby fastener position control is had or obtained for sides with different numbers of boards, or for work of different character from that shown. Furthermore, the staplers are relatively adjustable longitudinally of the machine to position them, if necessary or desirable, so that the staplers of one gang may complete its operation of at least one driving stroke on one box or crate side, while the other gang is operating on another side. In addition, the staplers of one gang are actuated simultaneously with the staplers of the other gang, so that all of the staplers drive or insert staples simultaneously. Furthermore, the staplers of both gangs all swing back and forth, longitudinally of the machine, simultaneously, so that they are all either moving forward or backward at the same time. The staplers are relatively adjustable so that all the staplers may be working on one and the same box or crate side, at the same time, depending on the size or shape or form of the box sides, and the distance the latter are spaced apart, or so that one gang of staplers may be operating on one box side, while the other gang is operating on another box side. In addition, the feed of the conveyor belt by which the box or crate side parts are moved along in a horizontal plane may be adjusted or varied, so that the feed of the work may be in properly timed relation to the operations of the staplers, according to the size or character of the box or crate sides being made, so that proper positioning of the staples on the box or crate sides may be insured.

What I claim as my invention is:

1. In a stapling machine, the combination of instrumentalities for feeding the work longitudinally of the machine, in a horizontally disposed plane, to receive successive groups of staples in rows from the front end of each unit of work to the rear end thereof, a gang of staplers disposed over said plane, to insert successive staples in longitudinal rows in the work to fasten the materials thereof together, and another gang of staplers disposed in front of said first-mentioned gang, to insert other longitudinal rows of staples, whereby each stapler inserts a row of successively driven staples in each unit of work, with all of the staples driven by one gang in transverse rows spaced from but parallel with the transverse rows of all of the staples driven by the other gang, the members of each gang being adjustable transversely of the machine, and the two gangs being adjustable toward and away from each other, whereby to change or vary the relative positions of the staples on the work, so that said instrumentalities are operative to present the work for successive operations of both gangs in unison upon the same unit of work, with each said operation in rear of the previous operation on the work, or for operation of one gang on one unit while the other gang is operating on another unit.

2. A structure as specified in claim 1, the staplers of one gang being disposed in staggered relation to the staplers of the other gang.

3. A structure as specified in claim 1, said stapler gangs being supported to move back and forth in unison, whereby the staplers move a distance with the work each time while staples are actually entering the materials of the work.

4. A structure as specified in claim 1, said stapler gangs being supported to swing back and forth in unison about transverse parallel overhead axes, whereby the staplers move a distance with the work each time while staples are actually entering the materials of the work.

5. A structure as specified in claim 1, said instrumentalities having continuous and uninterrupted feeding motion, and said stapler gangs, in any adjusted condition thereof, being movable back and forth in unison, in timed relation, whereby the staplers move a distance with the work each time while staples are actually entering the materials of the work.

6. A structure as specified in claim 1, comprising longitudinally disposed screws, and transversely arranged means for rotating said screws in unison, whereby to effect the said relative adjustment of stapler gangs toward and away from each other.

7. A structure as specified in claim 1, comprising overhead transverse shafts upon which the stapler gangs are hung, and power-transmitting mechanism for rotating said shafts in unison, thereby to actuate the staplers in unison.

8. A structure as specified in claim 1, comprising overhead transverse shafts upon the axes of which the stapler gangs are oscillated, and power-transmitting mechanism for rotating said shafts in unison, thereby to actuate the staplers in unison, said instrumentalities having a continuous and uninterrupted feeding motion, and said stapler gangs having means for causing them to swing back and forth in unison on said axes, whereby the two gangs move a distance with the work each time while staples are actually entering the materials of the work.

9. A structure as specified in claim 1, comprising transverse overhead shafts for supporting and actuating the staplers, a longitudinal drive shaft having power-transmitting connections to said transverse shafts, a transverse supplemental shaft having a driving connection from said longitudinal shaft, and means connected to said supplemental shaft to swing the stapler gangs in unison about their said overhead transverse actuating shafts, together with means for continuously driving said feeding instrumentalities from said supplemental shaft, whereby the stapler gangs swing back and forth in unison and move a distance with the work each time while staples are actually entering the materials of the work.

10. A structure as specified in claim 1, comprising longitudinally sliding means for adjusting the upper ends of the gangs toward and away from each other, and comprising longitudinally disposed screw means for adjusting the lower ends of the gangs toward and away from each other.

11. A structure as specified in claim 1, in combination with automatic devices to control the feeding of wire to the staplers, thereby to prevent the forming of staples at predetermined times in the actuation of the staplers.

12. A structure as specified in claim 1, in combination with automatic devices to control the feeding of wire to the staplers, thereby to prevent the forming of staples at predetermined times in the actuation of the staplers, together with means whereby the feeding instrumentalities have a continuous feeding motion, and means whereby the stapler gangs move a distance with the work each time while staples are actually entering the materials of the work.

13. In a stapling machine, means for feeding the work longitudinally of the machine, in a substantially horizontal plane, to receive successive groups of staples at intervals longitudinally in the same unit of work, staplers arranged one ahead of the other in the direction of travel of the work, operating in unison a plurality of times on each unit of work, in relative arrangement whereby the leading stapler may drive a longitudinal row of staples, and the stapler behind may drive another longitudinal row of staples, and means for relatively adjusting the staplers toward and away from each other, longitudinally of the machine, whereby the staples are driven either closer or farther apart in the direction of travel of the work.

14. A structure as specified in claim 13, in combination with means whereby said staplers are adjustable transversely of the machine, whereby the rear staplers may insert staples in the rows of the front staplers, or the rows may be spaced apart differently.

15. In a stapling machine, a stapler, an eccentric device for moving said stapler a distance with the work, while the staples are actually entering the materials of the work, and screw and slot means rotatable therewith for adjusting said eccentric device to change or vary the length of stroke thereof, to vary the extent of travel of the stapler with the work, comprising a shaft having a plurality of said eccentric devices thereon, and said adjusting means comprising a bracket adjustable on each device, pivoted on said shaft, with a connection between said brackets to insure adjustment in unison thereof.

16. In a stapling machine, the combination of a plurality of gangs of staplers, transverse shafts for supporting said stapler gangs transversely of the machine, a drive shaft extending longitudinally of the machine and gear connected with said transverse shafts, whereby the transverse shafts are rotated to actuate the staplers, means for driving the longitudinal shaft by power, and means for feeding the materials parallel with said longitudinal shaft.

17. A structure as specified in claim 16, comprising longitudinal feed belts forming said feeding means also driven from said longitudinal shaft.

18. A structure as specified in claim 16, comprising longitudinal feed belts also driven from said longitudinal shaft, said staplers being movable a distance with the work, and said feeding belts having a continuous and uninterrupted feeding motion, together with means operated by said longitudinal shaft to move the staplers back and forth over the work.

19. A structure as specified in claim 16, comprising longitudinal feed belts also driven from said longitudinal shaft, said staplers being movable a distance with the work, and said feeding belts having a continuous and uninterrupted feeding motion, together with means operated by said longitudinal shaft to move the staplers back and forth over the work, in combination with wire-feeding means also operated by power transmitted from said longitudinal shaft to feed wire to the staplers.

20. In a stapling machine, the combination of instrumentalities for feeding the work longitudinally of the machine, in a horizontally disposed plane, a gang of staplers disposed over said plane, to insert staples in the work to fasten the materials thereof together, and another gang of staplers disposed in front of said first-mentioned gang, the members of each gang being adjustable transversely of the machine, and the two gangs being adjustable toward and away from each other, whereby to change or vary the relative positions of the staples on the work, said stapler gangs being supported to swing back and forth in unison about transverse parallel overhead axes, whereby the staplers move a distance with the work each time while staples are actually entering the materials of the work.

21. In a stapling machine, the combination of instrumentalities for feeding the work longitudinally of the machine, in a horizontally disposed plane, a gang of staplers disposed over said plane, to insert staples in the work to fasten the materials thereof together, and another gang of staplers disposed in front of said first-mentioned gang, the members of each gang being adjustable transversely of the machine, and the two gangs being adjustable toward and away from each other, whereby to change or vary the relative positions of the staples on the work, comprising overhead transverse shafts upon the axes of which the stapler gangs are oscillated, and power-transmitting mechanism for rotating said shafts in unison, thereby to actuate the staplers in unison, said instrumentalities having a continuous and uninterrupted feeding motion, and said stapler gangs having means for causing them to swing back and forth in unison on said axes, whereby the two gangs move a distance with the work each time while staples are actually entering the materials of the work.

22. In a stapling machine, the combination of instrumentalities for feeding the work longitudinally of the machine, in a horizontally disposed plane, a gang of staplers disposed over said plane, to insert staples in the work to fasten the materials thereof together, and another gang of staplers disposed in front of said first-mentioned gang, the members of each gang being adjustable transversely of the machine, and the two gangs being adjustable toward and away from each other, whereby to change or vary the relative positions of the staples on the work, comprising transverse overhead shafts for supporting and actuating the staplers, a longitudinal drive shaft having power-transmitting connections to said transverse shafts, a transverse supplemental shaft having a driving connection from said longitudinal shaft, and means connected to said supplemental shaft to swing the stapler gangs in unison about their said overhead transverse actuating shafts, together with means for continuously driving said feeding instrumentalities from said supplemental shaft, whereby the stapler gangs swing back and forth in unison and move a distance with the work each time while staples are actually entering the materials of the work.

23. A stapling machine, a stapler, a continuous feeding means for feeding the work while the staples are being inserted therein, an eccentric device for moving said stapler a distance with the work, while the staples are actually entering the materials of the work, and means for adjusting said eccentric device to change or vary the extent of travel of the stapler with the work, comprising a shaft having a plurality of said eccentric cams thereon, and said adjusting means comprising a bracket adjustable on each cam, pivoted on said shaft, with a connection between said brackets to insure adjustment in unison therewith.

24. In a stapling machine, the combination of a plurality of gangs of staplers, transverse shafts for supporting said staplers, a longitudinal drive shaft gear connected with said transverse shafts, whereby the transverse shafts are rotated to actuate the staplers, and means for driving the longitudinal shaft by power, comprising longitudinal feed belts also driven from said longitudinal shaft, said staplers being movable a distance with the work, and said feeding belts having a continuous and uninterrupted feeding motion, together with means operated by said longitudinal shaft to move the staplers back and forth over the work.

25. In a stapling machine, the combination of a plurality of gangs of staplers, transverse shafts for supporting said staplers, a longitudinal drive shaft gear connected with said transverse shafts, whereby the transverse shafts are rotated to actuate the staplers, and means for driving the longitudinal shaft by power, comprising longitudinal feed belts also driven from said longitudinal shaft, said staplers being movable a distance with the work, and said feeding belts having a continuous and uninterrupted feeding motion, together with means operated by said longitudinal shaft to move the staplers back and forth over the work, in combination with wire-feeding means also operated by power transmitted from said longitudinal shaft to feed wire to the staplers.

26. In a stapling machine, the combination of instrumentalities for feeding the work longitudinally of the machine, in a horizontally disposed plane, a gang of staplers disposed over said plane, to insert successive staples in longitudinal rows in the work to fasten the materials thereof together, and another gang of staplers disposed in front of said first-mentioned gang, to insert other longitudinal rows of staples, whereby each stapler inserts a row of successively driven staples in each unit of work, the members of each gang being adjustable transversely of the machine, and the two gangs being adjustable toward and away from each other, whereby to change or vary the relative positions of the staples on the work, said stapler gangs being supported to move back and forth in unison, whereby the staplers move a distance with the work each time while staples are actually entering the materials of the work.

27. In a stapling machine, the combination of instrumentalities for feeding the work longitudinally of the machine, in a horizontally disposed plane, a gang of staplers disposed over said plane, to insert successive staples in longitudinal rows in the work to fasten the materials thereof together, and another gang of staplers disposed in front of said first-mentioned gang, to insert other longitudinal rows of staples, whereby each stapler inserts a row of successively driven staples in each unit of work, the members of each gang being adjustable transversely of the machine, and the two gangs being adjustable toward and away from each other, whereby to change or vary the relative positions of the staples on the work, said stapler gangs being supported to swing back and forth in unison about transverse parallel overhead axes, whereby the staplers move a distance with the work each time while staplers are actually entering the materials of the work.

28. In a stapling machine, the combination of instrumentalities for feeding the work longitudinally of the machine, in a horizontally disposed plane, a gang of staplers disposed over said plane, to insert successive staples in longitudinal rows in the work to fasten the materials thereof together, and another gang of staplers disposed in front of said first-mentioned gang, to insert other longitudinal rows of staples, whereby each stapler inserts a row of successively driven staples in each unit of work, the members of each gang being adjustable transversely of the machine, and the two gangs being adjustable toward and away from each other, whereby to change or vary the relative positions of the staples on the work, said instrumentalities having continuous and uninterrupted feeding motion, and said stapler gangs, in any adjusted condition thereof, being movable back and forth in unison, in timed relation, whereby the staplers move a distance with the work each time while staples are actually entering the materials of the work.

29. In a stapling machine, the combination of instrumentalities for feeding the work longitudinally of the machine, in a horizontally disposed plane, a gang of staplers disposed over said plane, to insert successive staples in longitudinal rows in the work to fasten the materials thereof together, and another gang of staplers disposed in front of said first-mentioned gang, to insert other longitudinal rows of staples, whereby each stapler inserts a row of successively driven staples in each unit of work, the members of each gang being adjustable transversely of the machine, and the two gangs being adjustable toward and away from each other, whereby to change or vary the relative positions of the staples on the work, comprising overhead transverse shafts upon which the stapler gangs are hung, and power-transmitting mechanism for rotating said shafts in unison, thereby to actuate the staplers in unison.

30. In a stapling machine, the combination of instrumentalities for feeding the work longitudinally of the machine, in a horizontally disposed plane, a gang of staplers disposed over said plane, to insert successive staples in longitudinal rows in the work to fasten the materials thereof together, and another gang of staplers disposed in front of said first-mentioned gang, to insert other longitudinal rows of staples, whereby each stapler inserts a row of successively driven staples in each unit of work, the members of each gang being adjustable transversely of the machine, and the two gangs being adjustable toward and away from each other, whereby to change or vary the relative positions of the staples on the work, comprising overhead transverse shafts upon the axes of which the stapler gangs are oscillated, and power-transmitting mechanism for rotating said shafts in unison, thereby to actuate the staplers in unison, said instrumentalities having a continuous and uninterrupted feeding motion, and said stapler gangs having means for causing them to swing back and forth in unison on said axes, whereby the two gangs move a distance with the work each time while staples are actually entering the materials of the work.

31. In a stapling machine, the combination of instrumentalities for feeding the work longitudinally of the machine, in a horizontally disposed plane, a gang of staplers disposed over said plane to insert successive staples in longitudinal rows in the work to fasten the materials thereof together, and another gang of staplers disposed in front of said first-mentioned gang, to insert other longitudinal rows of staples, whereby each stapler inserts a row of successively driven staples in each unit of work, the members of each gang being adjustable transversely of the machine, and the two gangs being adjustable toward and away from each other, whereby to change or vary the relative positions of the staples on the work, comprising transverse overhead shafts for supporting and actuating the staplers, a longitudinal drive shaft having power-transmitting connections to said transverse shafts, a transverse supplemental shaft having a driving connection from said longitudinal shaft, and means connected to said supplemental shaft to swing the stapler gangs in unison about their said overhead transverse actuating shafts, together with means for continuously driving said feeding instrumentalities from said supplemental shaft, whereby the stapler gangs swing back and forth in unison and move a distance with the work each time while staples are actually entering the materials of the work.

32. In a stapling machine, the combination of instrumentalities for feeding the work longitudinally of the machine, in a horizontally disposed plane, a gang of staplers disposed over said plane, to insert successive staples in longitudinal rows in the work to fasten the materials thereof together, and another gang of staplers disposed in front of said first-mentioned gang, to insert other longitudinal rows of staples, whereby each stapler inserts a row of successively driven staples in each unit of work, the members of each gang being adjustable transversely of the machine, and the two gangs being adjustable toward and away from each other, whereby to change or vary the relative positions of the staples on the work, in combination with automatic devices to control the feeding of wire to the staplers, thereby to prevent the forming of staples at predetermined times in the actuation of the staplers, together with means whereby the feeding instrumentalities have a continuous feeding motion, and means whereby the stapler gangs move a distance with the work each time while staples are actually entering the materials of the work.

33. A stapling machine, a stapler, a continuous feeding means for feeding the work while the staples are being inserted therein, an eccentric device for moving said stapler a distance with the work, while the staples are actually entering the materials of the work, and means for adjusting said eccentric device to change or vary the length of stroke thereof, to vary the extent of travel of the stapler with the work, comprising a shaft having a plurality of said eccentric cams thereon, and said adjusting means comprising a bracket adjustable on each cam, pivoted on said shaft, with a connection between said brackets to insure adjustment in unison therewith.

34. In a machine for forming box sides from boards and battens, in combination, a conveyor mechanism to receive and hold the assembled parts of a plurality of sides spaced therealong, means to move said conveyor at a uniform speed, a pair of fastener driving assemblies spaced along the path of the said conveyor, and means to move the fastener driving parts of the assemblies in the same direction and at the same speed as the side parts during the actual driving operation, by swinging said assemblies about overhead transverse axes, means to permit changing of the relative positions of said assemblies, and means to permit changing of the ratio of conveyor speed to stroke rate whereby fastener position control is had for sides with different numbers of boards.

35. In a machine for forming box sides from boards and battens, in combination, a conveyor mechanism to receive and hold the assembled parts of a plurality of sides spaced therealong, means to move said conveyor at a uniform speed, a pair of fastener driving assemblies spaced along the path of the said conveyor, means to move the fastener driving parts of the assemblies in the same direction and at the same speed as the side parts during the actual driving operation, by swinging said assemblies about overhead transverse axes, and means to permit of relative adjustment of said assemblies along said path to position them so that one completes its operation of at least one driving stroke on one side while the other operates on another side.

36. In a machine for forming box sides from boards and battens, in combination, a conveyor mechanism to receive and hold the assembled parts of a plurality of sides spaced therealong, means to move said conveyor at a uniform speed, a pair of fastener drivers spaced one ahead of the other along the path of the said conveyor, in a vertical plane extending more or less obliquely to said path, when viewed from above, so that they drive parallel longitudinal rows of fasteners, with the fasteners in one row alternating with those of the other row, means simultaneously to actuate said drivers, so that they both insert staples at the same time, and means simultaneously to move the fastener drivers in the same direction and at the same speed as the side parts during the actual driving operation, means to permit changing the relative positions of said drivers, serving to vary the distance between staples in each row, and means to permit changing the ratio of conveyor speed to stroke rate whereby fastener position control is had for sides with different numbers of boards, in a machine in which there is only the said single driver for each row.

37. A structure as specified in claim 36, comprising means to adjust the drivers laterally to change or vary the distance between the parallel longitudinal rows of fasteners.

38. In a machine for forming box sides from boards and battens, in combination, a conveyor mechanism to receive and hold the assembled parts of a plurality of sides spaced apart therealong, means to move said conveyor at a uniform speed, a pair of fastener drivers spaced one ahead of the other along the path of said conveyor, in a vertical plane extending more or less obliquely to said path, when viewed from above, so that they drive parallel longitudinal rows of fasteners, with the fasteners in one row alternating with those of the other row, means simultaneously to actuate said drivers, so that they both insert fasteners at the same time, means to simultaneously move the fastener drivers in the same direction and at the same speed as the side parts during the actual driving operation, and means to permit of relative adjustment of said drivers, serving to vary the distance between fasteners in each row, and also to position them so that one completes its operation of at least one driving stroke on one side while the other operates on another side, in a machine in which there is only the said single driver for each row.

39. A structure as specified in claim 38, comprising means to adjust the drivers laterally to change or vary the distance between the parallel longitudinal rows of fasteners.

40. In a machine for forming box sides from boards and battens, in combination, a conveyor mechanism to receive and hold the assembled parts of a plurality of sides spaced therealong, means to move said conveyor at a uniform speed, a pair of swinging fastener driving assemblies spaced one ahead of the other along the path of the said conveyor, means whereby said assemblies are coupled together at their lower ends, and means to move the fastener driving parts of the assemblies in the same direction and at the same speed as the side parts during the actual driving operation, means to permit changing the relative positions of said assemblies, and means to permit changing the ratio of conveyor speed to stroke rate whereby fastener position control is had for sides with different numbers of boards, the assemblies being relatively adjustable to both operate simultaneously on one side before either assembly operates on a subsequent side.

41. In a machine for forming box sides from boards and battens, in combination, a conveyor mechanism to receive and hold the assembled parts of a plurality of sides spaced therealong, means to move said conveyor at a uniform speed, a pair of swinging fastener driving assemblies spaced one ahead of the other along the path of said conveyor, means whereby said assemblies are coupled together at their lower ends, means to move the fastener driving parts of the assemblies in the same direction and at the same speed as the side parts during the actual driving operation, and means to permit of relative adjustment of said assemblies along said path to position them so that one completes its operation of at least one driving stroke on one side while the other operates on another side, the assemblies being relatively adjustable to both operate simultaneously on one side before either assembly operates on a subsequent side.

42. In a machine for forming box sides from boards and battens, in combination, a conveyor mechanism to receive and hold the assembled parts of a plurality of sides spaced therealong, means to move said conveyor at a uniform speed, a pair of fastener drivers spaced one ahead of the other along the path of the said conveyor, in a vertical plane extending more or less obliquely to said path, so that they drive parallel longitudinal rows of fasteners, with the fasteners in one row alternating with those of the other row, means whereby said drivers are mounted to swing longitudinally of the machine, means simultaneously to actuate said drivers, so that they both insert fasteners at the same time, and means simultaneously to move the fastener drivers in the same direction and at the same speed as the side parts during the actual driving operation, including an adjustable screw connection between the lower ends of said drivers, means to permit changing the relative positions of said drivers, and means to permit changing the ratio of conveyor speed to stroke rate whereby fastener position control is had for sides with different numbers of boards.

43. In a machine for forming box sides from boards and battens, in combination, a conveyor mechanism to receive and hold the assembled parts of a plurality of sides spaced apart therealong, means to move said conveyor at a uniform speed, a pair of fastener drivers spaced one ahead of the other along the path of said conveyor, in a vertical plane extending more or less obliquely to said path, when viewed from above, so that they drive parallel longitudinal rows of fasteners, with the fasteners in one row alternating with those of the other row, means whereby said drivers are mounted to swing longitudinally of the machine, means simultaneously to actuate said drivers, so that they both insert fasteners at the same time, and means simultaneously to move the fastener drivers in the same direction and at the same speed as the side parts during the actual driving operation, including an adjustable screw connection between the lower ends of said drivers, and means including said screw connection to permit of relative adjustment of said drivers along said path to position them so that one completes its operation of at least one driving stroke on one side while the other operates on another side.

44. In a machine for forming box sides from boards and battens, in combination, a conveyor mechanism to receive and hold the assembled parts of a plurality of sides spaced therealong, means to move said conveyor at a substantially uniform speed, independently operable fastener driving assemblies longitudinally spaced along the path of said conveyor, means to so reciprocate the fastener driving parts of the assemblies that during the driving strokes they are moving about a plurality of overhead transverse axes at substantially the same speed and in the same direction as the side parts, with said axes spaced apart in a common horizontal plane, and means to permit changing the ratio of conveyor speed to fastener stroke rate whereby control is had of the spacing of fasteners in the side parts.

45. In a machine for forming box sides from boards and battens, in combination, a conveyor mechanism to receive and hold the assembled parts of a plurality of sides spaced therealong, means to move said conveyor at a substantially uniform speed, independently operable fastener driving assemblies longitudinally spaced along the path of said conveyor, means to so reciprocate the fastener driving parts of the assemblies that during the driving strokes they are moving about a plurality of overhead transverse axes at substantially the same speed and in the same direction as the side parts, with said axes spaced apart in a common horizontal plane, means to permit changing the ratio of conveyor speed to fastener stroke rate, and means to permit adjusting the rate of travel of the fastener driving parts in the direction of conveyor travel to compensate for changes in conveyor speed.

46. In a machine for forming box sides from boards and battens, in combination, a conveyor mechanism to receive and hold the assembled parts of a plurality of sides spaced therealong, means to move said conveyor at a substantially uniform speed, independentdly operable fastener driving assemblies longitudinally spaced along the path of said conveyor, means to so reciprocate the fastener driving parts of the assemblies that during the driving strokes they are moving about a plurality of overhead transverse axes at substantially the same speed and in the same direction as the side parts, with said axes spaced apart in a common horizontal plane, means to permit changing the ratio of conveyor speed to fastener stroke rate, and means to permit adjusting the range of travel of the fastener driving parts in the direction of travel of the conveyor to compensate for changes in conveyor speed.

47. In a machine for forming box sides from boards and battens, in combination, a conveyor mechanism to receive and hold the assembled parts of a plurality of sides spaced therealong, means to move said conveyor at a substantially uniform speed, fastener driving assemblies spaced along the path of said conveyor, means to so reciprocate the fastener driving parts of the assemblies that during the driving strokes they are moving about a plurality of overhead transverse axes at substantially the same speed and in the same direction as the side parts, with said axes spaced apart in a common horizontal plane, means to operate said fastener assemblies so that their driving strokes are so timed that fasteners are driven in parallel rows in uniform staggered relation, and means permitting the relative spacing of said assemblies to be changed while retaining said relation.

WALTER F. NEWHOUSE.